United States Patent
Matsunaga et al.

[15] 3,685,413
[45] Aug. 22, 1972

[54] CAMERA APPARATUS FOR TAKING STEREOGRAPHIC PHOTOGRAPHS

[72] Inventors: Kenji Matsunaga; Michio Horiuchi; Takao Suzuki, all of Tokyo, Japan

[73] Assignee: Dai Nippon Insatu Kabushiki Kaisha, Tokyo, Japan

[22] Filed: Oct. 24, 1969

[21] Appl. No.: 869,270

[52] U.S. Cl. ................................................95/18 P
[51] Int. Cl. ...........................................G03b 35/08
[58] Field of Search............................95/18 P, 36 R

[56] References Cited

UNITED STATES PATENTS

| | | | |
|---|---|---|---|
| 1,950,374 | 3/1934 | Kanolt | 95/18 P |
| 1,977,310 | 10/1934 | Kanolt | 95/18 |
| 2,485,811 | 10/1949 | Bonnet | 95/18 |
| 2,622,472 | 12/1952 | Bonnet | 95/18 X |

Primary Examiner—Samuel S. Matthews
Assistant Examiner—Fred L. Braun
Attorney—Wenderoth, Lind & Ponack

[57] ABSTRACT

A camera mechanism for taking stereographic photographs, embodying a first mechanism for moving a lenticular screen, a second mechanism operatively interconnected with the first mechanism, and operable to control the shutter at prescribed time intervals to make exposures correlated to the movement of the light-restricting screen, and a third mechanism controlling the travel of the camera at predetermined increments of travel relative to the subject being photographed. The camera mechanism further embodies electrical programming circuitry for electrically interconnecting the first, second and third mechanisms to correlate a predetermined amount of camera travel with a predetermined movement of the lenticular screen and the corresponding timely actuation of the shutter.

11 Claims, 8 Drawing Figures

PATENTED AUG 22 1972 3,685,413

KENJI MATSUNAGA,
MICHIO HORIUCHI and
TAKAO SUZUKI,
INVENTORs

BY Wenderoth, Lind & Ponack
ATTORNEYs

KENJI MATSUNAGA,
MICHIO HORIUCHI and
TAKAO SUZUKI
: INVENTORS

BY Wenderoth, Lind & Ponack
ATTORNEYS

CAMERA APPARATUS FOR TAKING STEREOGRAPHIC PHOTOGRAPHS

This invention relates to a camera provided with a first mechanism for moving a lenticular screen or a slit and a second mechanism for opening and closing a shutter in order to take a photograph of more interest in the form of a stereograph. Further, the camera of this invention is provided with a third mechanism for controlling the travel of the camera, with all three mechanisms being interrelated.

The invention will be better understood when considered in conjunction with the illustrative drawings, wherein.

Figure 1:
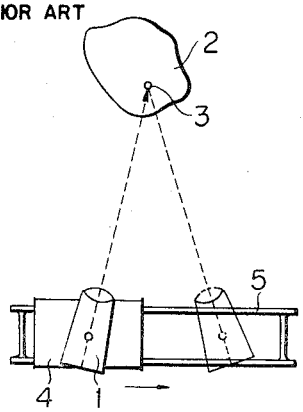
FIG. 1 is a schematic plan view of a prior art relationship of a camera movable along a fixed path relative to subject being photographed.
Figure 1A:
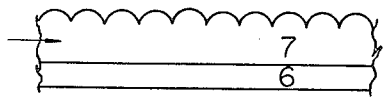
FIG. 1a is a fragmentary diagrammatic end view of a lenticular screen movably superposed upon a photographic film or photo-sensitive surface.

One of the conventional techniques for photographing a point of interest in the form of a stereograph by using a single camera and a lenticular screen is illustrated by referring to the accompanying FIG. 1. According to the prior art form shown in FIG. 1, a camera 1 is placed on a rest wheel or carriage 4 which can be moved on a rail 5. The camera 1 can look fixedly at the center 3 of a subject or a point of interest 2 placed at a desired distance from said camera during a period of time of its movement on the rail 5. As shown in FIG. 1a, a lenticular screen 7 disposed adjacent the surface of a film 6 is moved in the same direction as the movement of the camera 1, and is adapted to move relative to the film a distance equal to the spacing for one pitch during a period of time of opening the shutter. Namely, the time required for this movement is controlled so as to be equal to the time required for opening the shutter. It is necessary for the lenticular screen to be moved the requisite distance with high accuracy during a period of time of opening the shutter, otherwise if error occurs it causes the degradation of the stereograph. In practice, the conventional lenticular screen has pitch distances of from 0.2 to 0.5, millimeter, and an allowable error in the moving distance of the lenticular screen or the slit is ± 0.01 millimeter or less. In the case of the conventional cameras using the principle as illustrated by referring to FIG. 1, the opening and closing of the shutter are conducted independently of the traveling of the lenticular screen, and such cameras have the disadvantage of causing error in the moving distance of the lenticular screen during a period of time of opening the shutter. Also the known conventional cameras for photographing subjects of interest in the form of a stereograph are large-sized and heavy, and it is difficult to use them for photographing outdoor points of interest. Thus it has been desired to develop a small-size and light weight camera having high accuracy in the moving distance and the moving speed of the lenticular screen for photographing stereographically.

Also, it is necessary to keep the moving speed of the lenticular screen constant relative to the moving speed of the camera during a period of time of photographing a stereograph. For this purpose, it is necessary to eliminate the backlash of the photographing apparatus after it was started and also the carriage 4 must be moved on the rail 5 for an additional distance to be moved for obtaining a certain constant speed of the carriage. A relationship between the moving speed of the lenticular screen and the additional distance required for moving the carriage 4 on which a camera is placed, is illustrated hereinafter by referring to the accompanying FIG. 2.

Figure 2:
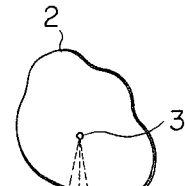
FIG. 2 is a view similar to FIG. 1, but on an enlarged scale.

In FIG. 2, the camera 1 placed on the carriage 4 is positioned at the point "C" facing toward to the front of the center 3 of the point of interest 2, and a focus adjustment is made of said camera. If it is assumed that the camera 1 is moved for the distance $a$ during a period of time of opening the shutter, it is desired that the shutter opens at the point "A." and closes at the point "B" for setting the relationship as indicated by the equation of $\overline{AC} = \overline{BC} = a/2$. Thus, the lenticular screen and the camera must be moved for a desirable additional distance depending on the shutter speed and the moving distance of the camera. In FIG. 2, if it is assumed that the point "D" is the position for starting the camera on the rail, the distance as indicated by $\overline{DA}$ is the additional distance required for moving the lenticular screen and the camera. In other words, when the camera is started from the point "D" and reaches the point "A," the shutter is opened and the carriage and the lenticular screen achieve a certain constant speed during the traveling of the camera for the additional distance as indicated by the distance $\overline{DA}$.

An object of this invention is to provide a camera comprising a first mechanism for moving a lenticular screen and a second mechanism for opening and closing a shutter in order to take a stereograph of the subject of interest.

A further object of this invention is to provide a camera comprising a first mechanism for shiftably moving a lenticular screen, a second mechanism for opening and closing a shutter and a third mechanism for controlling the movement of the camera in order to take a stereograph of interest, and with all three mechanisms cooperatively interrelated.

Figure 3:
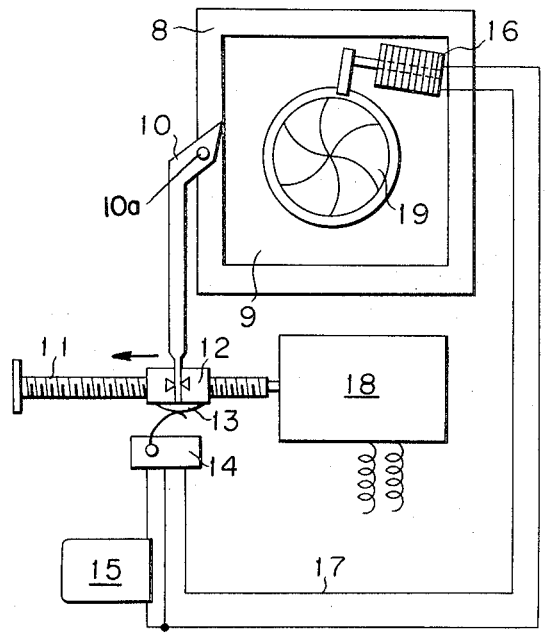
FIG. 3 is a schematic elevational view of the first and second mechanisms of one form of the improved invention in which a shiftable frame-supported lenticular screen has the shifting mechanism therefor interconnected to the shutter mechanism.

An embodiment of this invention is illustrated by referring to the accompanying FIG. 3 showing a synchronous operation in the moving of the lenticular screen, and the opening and closing of the shutter.

In FIG. 3, the numeral 8 is a frame disposed behind a camera and the frame is provided with a lenticular screen 9. The lenticular screen 9 is mounted in any conventional manner for movement relative to the frame and is moved by an end of a lever 10 pivoted to the frame 8, and can be moved with precision. The other end of the lever 10 is pressed or controlled by a special nut 12 which is held on a bolt 11 so that it does not rotate but can be moved along the screw thread of the bolt. The lever 10 is rotatable around the pivot point 10a of the lever. The special nut 12 is provided with a metal member or cam-like 13 on the back side of the special nut. A limit switch 14 is placed at a position below the metal member 13. The limit switch 14 is connected with an electrical conductor wire 17. The bolt 11 is rotated by a motor 18 and the special nut 12 is moved, as from the right-hand side to the left-hand side, thereby causing the lever 10 to rotate. The D.C. electric current is fed to a solenoid coil 16 and a shutter 19 is open during the closing of the limit switch 14 by the metal cam-like member 13 fixed to the special nut 12. When the lever 10 is rotated by the afore-described action on its pivot 10a, the lenticular screen 9 is moved by the end of the lever. By adjusting the position of the pivot point relative to one end of the lever 10, the minute distance of one pitch of the lenticular screen as it is moved can be magnified by and controlled the action of the other end of the lever attached via nut 12 to the bolt 11. By adjusting the length of the metal cam-like member 13 and using the limit switch 14, the shutter 19 is open for the period of time during which the lenticular screen 9 is moved one pitch. Also, it is possible to control the pitch moving distance of the lenticular screen 9 with a high degree of accuracy due to the lever arrangement and mechanical advantage derived therefrom.

In this connection, the relationship between the opening and the closing of the shutter and the additional distance required for moving the camera is fully explained hereinafter by referring again to FIGS. 2 and 3.

When the camera 1 reaches the point "A," the metal member 13 which is fixed to the special nut 12 must reach the position to contact the limit switch 14 for opening and closing the shutter. Also, the metal member 13 must travel to the position to release from the limit switch 14 and simultaneously the camera must reach the point "B" during a period of time of opening and closing the shutter. Incidentally the time required for opening and closing the shutter (or the shutter speed) is varied independently of the travel distance of the carriage (or the traveling speed of the carriage) on which the camera is placed, and therefore the starting position "D" of the camera which is set by taking into consideration the additional distance required for moving the carriage is not constant in every case even if the travel distance of the carriage is set. Therefore, in the conventional photographing techniques, the work must be conducted by starting the camera only after the carriage is moved to the point "D" which is set by calculating the additional distance required for moving the carriage in considering the shutter speed and the traveling speed of the carriage.

In accordance with a further embodiment of this invention, a camera for photographing stereographically can be operated by opening the shutter at the predetermined position of the camera after the carriage has been automatically moved by the action of an electric system for the additional distance in a certain proportion relative to the traveling distance of the carriage, and also by closing the shutter after the lenticular screen has moved one pitch and the camera has moved a predetermined distance during the predetermined time required for opening and closing the shutter.

The camera according to the further embodiment of this invention can be operated without calculation of the additional distance required for moving the carriage and therefore the efficiency of photographing such an interest is remarkably increased by using said camera when the photographing is conducted outdoors in open air where there is little chance and a short time for opening and closing the shutter.

Figure 7:
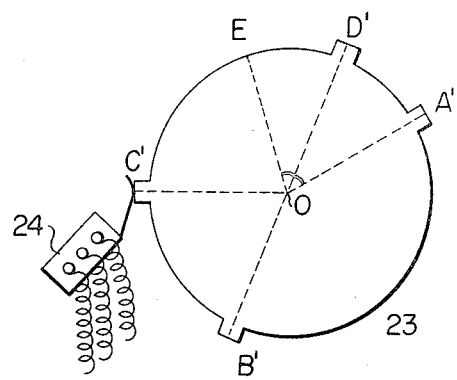
FIG. 7 is a fragmentary enlarged detail of the disc of FIG. 5.
Figure 4:
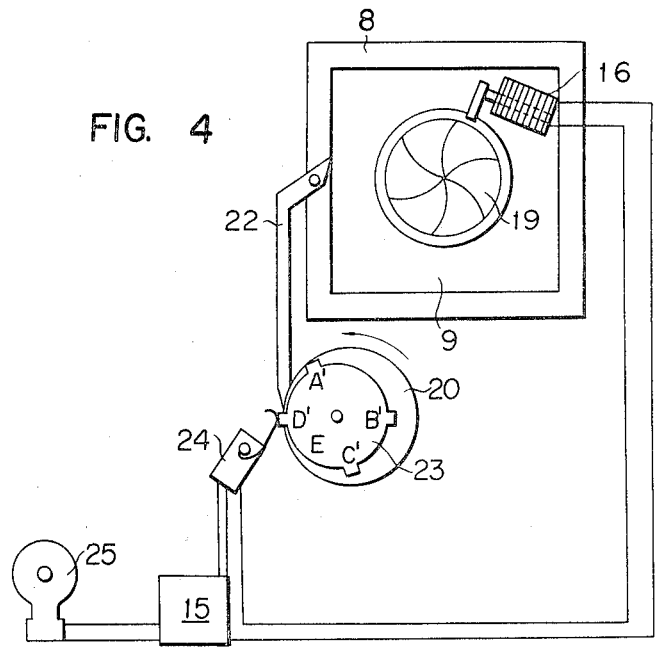
FIG. 4 is a view similar to FIG. 3, but depicting a modified embodiment.
Figure 5:
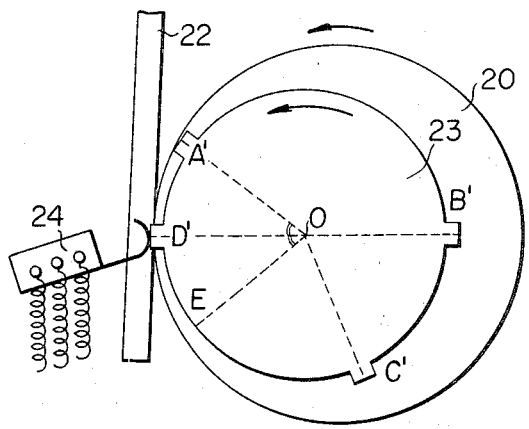
FIG. 5 is a fragmentary enlarged detail of the modified means of FIG. 4 for actuating both the screen shiftable movements and the shutter.
Figure 6:
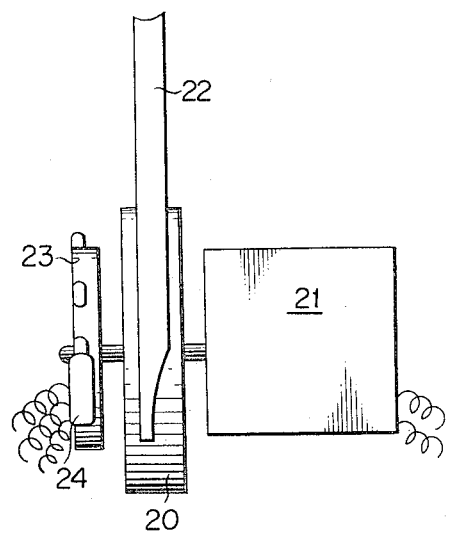
FIG. 6 is a schematic view on a smaller scale showing the components of FIG. 5 as viewed generally transversely to FIG. 5.

The camera is illustrated hereinafter by referring to the accompanying drawings 4, 5, 6 and 7 in which the numerals 8, 9 and 16 indicate the same members as those indicated by the numerals 8, 9 and 16 in FIG. 3. The numeral 22 is a lever which is designed by modifying the end of lever 10 as shown in FIG. 3. An eccentric cam 20 is driven by a motor 21 as shown in FIG. 6 and the lever is moved. The eccentric cam 20 is rotated always in the direction as indicated by an arrow in FIG. 4 and the mechanical backlash is negligible. A disc 23 having the projection A', B', C' and D' is fixed coaxially with the eccentric cam 20 and rotated in the same direction as that of the eccentric cam 20, as indicated by an arrow in FIG. 5. The lever 22 is pushed by the eccentric cam 20 within the range of the semicircle D'A'B' of the disc 23, that is within the 180' angle. A limit switch 24 is closed when it contacts the projections A', B', C' and D' of the disc 23, and also the limit switch is open when it releases the projections A', B', C' and D'. The signals dispatched by the on- and off- action are selectively transferred to a motor 25 for driving the carriage on which the camera is placed and a solenoid coil 16 for opening and closing a shutter 19 by the logical circuit. The angular distribution formed between projections is shown in FIG. 5. When the limit switch 24 contacts the projection C', the camera reaches the point C on the rail 5 as shown in FIG. 2 and the camera faces the subject 2 and then the focus of the camera is adjusted. When the disc 23 is rotated, the projection C' releases the limit switch 24 to dispatch a cut signal and the cut signal starts the motor 25 for moving the carriage on the rail 5 in the direction from the point "C" to the point "D" as shown in FIG. 2 (C → D). When the limit switch is passed the point "E" which has no projection, and the carriage arrives at the point "A" on the rail 5, the carriage is moved to the point "D" on the rail 5 as shown in FIG. 2. The disc 23 is rotated until an input signal is generated by the action of the projection "D'"contacting the limit switch. Thus, it is noted that the angle < C'OE formed in the disc 23 corresponds to the travel distance of the carriage which is measured by the distance from the point "C" to the point "A" on the rail and the travel distance is a half of the total travel distance of the carriage, and also that the angle < EOD' formed in the disc 23 corresponds to the additional distance required for moving the carriage from the point "A" to the point "D." The motor 25 is rotated reversely by receiving the cut signal dispatched from the projection D' of the disc 23. The shutter is open by receiving the input signal dispatched from the projection A', the angle < D'OA' becomes equal to the angle < EOD', the carriage 4 is transferred for the additional distance measured from the point "D" to the point "A" and the lenticular screen is transferred or shifted for the additional distance corresponding to the angle < D'OA' which is the rotated momentum of the eccentric cam 20. When the disc 23 and the carriage 4 are moved continuously until the projection B' reaches the place of the limit switch 24, the carriage 4 reaches the point "B" on the rail 5 as shown in FIG. 2 and the shutter is closed. The lenticular screen is moved within the range of the arc A'B' during a period of time of opening and closing the shutter and the moving momentum of the lenticular screen can be adjusted by changing the pivoted center of the lever 22 or changing the rotated momentum of the eccentric cam 20. When the shutter is closed, the carriage is transferred from the point "B" to the point "C", and the disc 23 and the carriage 4 are stopped by receiving the input signal generated from the projection C' of the disc 23 as shown in FIG. 7. In this case, if the angle < B'OC' is set to be half of the angle < A'OB' (< OC' = ½ < A'OB'), the carriage 4 can be stopped at the point "C" on the rail as shown in FIG. 2, and it is possible to get ready for a further photographing procedure.

Although this invention is illustrated by referring to the accompanying drawings, it should be noted that this invention includes some modifications without departing from the spirit of this invention as illustrated hereinafter.

Namely, the lenticular screen referred to is understood by those skilled in the art, to include screen devices having a plurality of lenticules (or lens-like elements), or a plurality of apertures to restrict the fall of the exposure light onto the sensitive film surface in narrow vertical restricted areas.

Further, the disc 23 is modifiable by changing the projections to concave recesses or the peripheral surface of the disc 23 is provided with an insulator and a conductor alternately spaced thereon. In addition, the limit switch 24 can be replaced with a photo-switch, a reading switch and a magnet diode which can be operated by cutting the light or approaching of the magnetic field. Still further, the limit switch 24 can be replaced with a rotary drum and a phototransistor and also a plurality of limit switches 24 are interlocked with the disc 23 having one single projection.

What we claim is that:

1. In a camera mechanism with lens means for photographing pictures stereographically in relief, including a movable lenticular screen, electrically operated shutter means for exposing through the lens means a photographic sensitive surface whereby the lenticular screen serves to restrict the fall of exposure light to a plurality of separately restricted areas only of said sensitive surface, the improvement comprising:
   a. a first-mechanism constituting an improved lever and activating mechanism for more accurately moving said lenticular screen a predetermined distance, and
   b. a second mechanism for opening and closing the shutter means operatively interconnected to said lenticular screen activating mechanism;
   c. said first mechanism including:
      1. a frame to hold said lenticular screen so that said screen is capable of laterally shifting movements relative to the frame and lens means;
      2. an angular lever adjustably and pivotally mounted near an upper end on said frame with the latter end which is adjacent the pivotal mounting being selectably engageable with said screen to move same; said lever having an opposite lower depending end to which a sleeve nut is mechanically connected to help actuate said lever;
      3. a rotatable screw-threaded adjusting bolt mounted generally transverse to the depending lever, said sleeve nut mounted upon said bolt in a non-rotative but axially shiftable manner, whereby the sleeve nut is adjustably moved axially thereon responsive to relative rotation of said adjusting bolt to effect very accurate adjustment and correlated shifting movement of said screen relative to the frame;
   d. said second mechanism for operatively interconnecting said shutter opening and closing mechanism with said lenticular screen activating mechanism, including:
      1. a switch-closing member attached to said sleeve nut on the adjusting bolt;
      2. an electrical circuit for operating said shutter means; said circuit including a limit switch and electrical solenoid means connected into the circuit with said limit switch mounted adjacent to said for engagement by said switch-closing member on said sleeve nut; and
   e. said first and second mechanisms being interconnected, whereby said shutter means is timely activated responsive to closing of said limit switch by said switch closing member at a precisely predetermined time when the predetermined shiftable movement of said lenticular screen has been effected to enable photographing the subject from the particular angle of the camera relative to the subject.

2. In a camera mechanism with lens means for photographing pictures stereographically in relief, including a movable lenticular screen together with electrically operated shutter means for exposing through the lens means a photographic sensitive surface whereby the lenticular screen serves to restrict the fall of exposure light to a plurality of separately restricted areas only of said sensitive surface, the improvement comprising:
   a. a first mechanism constituting a lever and activating mechanism for accurately moving the lenticular screen a predetermined distance, said first mechanism further including:
      1. a frame to adjustably hold a lenticular screen so that the lenticular screen is laterally shiftable relative to the frame and lens;
      2. an angular lever adjustably and pivotally mounted near an upper end on said frame with the latter end which is adjacent the pivotal mounting being selectably engageable with said screen to move same; said lever having an opposite lower depending end to be actuated to impart a generally oppositely directed movement to said upper end of said lever;
   b. a second mechanism comprising cam means for interconnecting said lenticular screen activating mechanism with a third mechanism; said cam means including an eccentric cam and motive power drive means for rotating said cam, said cam mounted to rotatably engage said depending lower end of said lever to effect predetermined movement of said lenticular screen; and c. said third mechanism being effective for controlling the travel movement of the camera relative to the subject, and being operatively interconnected with said first and second mechanisms; said third mechanism comprising carriage means for movably mounting the camera for lateral travel relative to a subject being photographed, and including motive drive means for moving said carriage at predetermined increments of travel; and d. electrical programming means electrically interconnecting said first and second mechanism and said carriage means of the third mechanism to correlate a predetermined amount of camera travel with a predetermined movement of the lenticular screen and the corresponding timely actuation of the shutter means.

3. The camera apparatus as defined in claim 2 wherein the third mechanism further includes a circular disc mounted coaxially with said cam and having electrical contact-making and breaking areas at predetermined places on its outer periphery, and limit switch means engageable by said areas for helping to effect the camera travel, lenticular screen movement, and shutter operation.

4. The apparatus as defined in claim 3 wherein said contact-making and-breaking areas are projections on said disc periphery.

5. The apparatus as defined in claim 3 wherein said contact-making and-breaking areas are recessed notch-like areas in said disc periphery.

6. The apparatus as defined in claim 3 wherein said contact-making and-breaking areas are a series of electrical conductors interspersed with alternate insulating means therebetween at the predetermined areas.

7. Camera apparatus as defined in claim 3 wherein said limit switch is a photo-switch.

8. Camera apparatus as defined in claim 3 wherein said limit switch is a reading switch.

9. Camera apparatus as defined in claim 3 wherein said limit switch is a magnet diode.

10. Camera apparatus as defined in claim 3 wherein said limit switch is a rotary drum.

11. Camera apparatus as defined in claim 3 wherein said limit switch is a phototransistor.

* * * * *

UNITED STATES PATENT OFFICE
CERTIFICATE OF CORRECTION

Patent No. 3,685,413          Dated August 22, 1972

Inventor(s) KENJI MATSUNAGA ET AL

It is certified that error appears in the above-identified patent and that said Letters Patent are hereby corrected as shown below:

On the Title Sheet between items 21 and 52 insert:

-- [30] Foreign Application Priority Data December 28, 1968, Japan 861/69 --.

Signed and sealed this 15th day of May 1973.

(SEAL)
Attest:

EDWARD M. FLETCHER, JR.
Attesting Officer

ROBERT GOTTSCHALK
Commissioner of Patents